Patented Nov. 28, 1939

2,181,231

UNITED STATES PATENT OFFICE 2,181,231

SYNTHETIC THERMOPLASTIC RESINS

Philip H. Groggins, John T. Stearn, and Benjamin Makower, Washington, D. C.

No Drawing. Application October 5, 1938, Serial No. 233,424

6 Claims. (Cl. 260—75)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and used by or for the Government for governmental purposes without the payment to us of any royalty thereon.

Our invention relates to a process for making synthetic thermoplastic resins comprising three components, namely, a polyhydric alcohol, a hydroxycarboxylic acid and a polybasic acid. The resins made in accordance with our discovery are light in color and may be considered as being complex alkyds.

More specifically, our invention relates to resinous compounds which are produced by a secondary esterification with polybasic organic acids, of esters previously produced by the reaction of polyhydric alcohols with hydroxycarboxylic acids. The initial structural formula of these new resins may be illustrated by the product obtained by esterifying glyceryl dilactate with phthalic anhydride; and the following is a greatly simplified representation of the structural formula of the basic resin molecule:

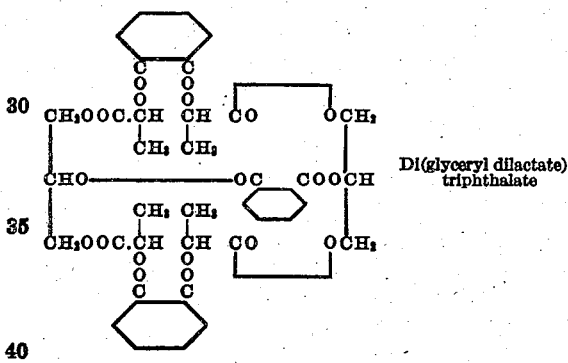

Di(glyceryl dilactate) triphthalate

It is clear, however, that many isomeric as well as closely related compounds may be formed during the primary and secondary esterifications.

When sebacic acid is employed as the secondary dibasic esterifying component, the simplified representation of the resin molecule may be as follows:

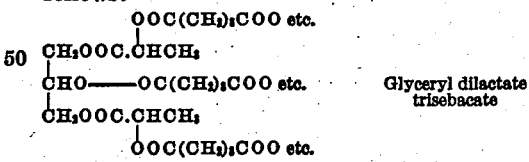

Glyceryl dilactate trisebacate

When lactic acid is replaced by another hydroxycarboxylic acid such as tartaric acid, and sebacic acid is used as the dibasic acid, the single resin molecule which is obtained as a result of successive esterifications may be represented thus:

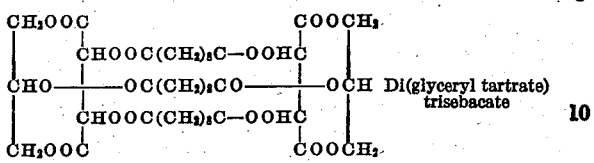

Di(glyceryl tartrate) trisebacate

It is clear from the preceding formulations that, unlike the usual alkyd resins, here, a hydroxycarboxylic acid is condensed with a polyhydric alcohol and furthermore, the polybasic acid is subsequently esterified with both components of the primary ester. Such a dual bonding would be expected to result in a more resistant and flexible resin and, this has been found by diverse tests to be the case. It is also to be observed that the single resin molecule may be made to have three active acidic functions which make possible the formation of long chains of molecules through the following chemical reactions: (1) further esterification, (2) anhydride formation, and (3) cross linking between low-molecular-weight resin molecules. The net result is that closely related macromolecules are formed and a tough and flexible resin results.

We have found that it is also possible to reverse the process by first esterifying the polybasic acid with the hydroxycarboxylic acids and using the polyhydric alcohol as the final esterifying component. Thus we can first prepare the ester of the lactic acid and sebacic acids and treat the sebacyl lactate with a polyhydric alcohol e. g., glycerol. There are at least two steps which characterize our invention:

(1) Primary esterification with a hydroxycarboxylic acid to give an ester which contains at least as many hydroxyl or carboxyl groups as are available in either the polyhydric alcohol or polybasic acid initially employed. This characteristic differs fundamentally from the usual alkyd resins where reaction between a polyhydric alcohol and a polybasic acid results in a diminution of the reactive hydroxyl or carboxyl functions;

(2) Secondary esterification with either a polybasic acid or polyhydric alcohol, depending on the type of reaction. Thus, when working in accordance with our invention, the reactive hydroxyl or carboxyl groups of the primary ester are located on both components of the original ester and when further treated with polyhydric alcohols or polybasic acids give the dual bonding as shown in the formulas above.

The resins produced by the secondary esterification of simple esters of polyhydric alcohols and hydroxycarboxylic acids are generally pale yellow in color. At first, they are soluble in most organic solvents and disperse colloidally in linseed oil. When the esterification and heating processes are carried farther, the resins become insoluble in water, ethanol, toluene, turpentine and linseed oil. They are soluble in the solvents employed for cellulose lacquers e. g., amyl acetate. They are only slowly attacked by hot 10 to 20 per cent sodium hydroxide. Some of the resins are quite resilient at room temperature and can be pulled and stretched.

The following examples illustrate the general mode of preparation of chemical compositions and resinous materials according to our invention:

EXAMPLE I.—*Di(glyceryl dilactate) triphthalate resins* d-Lactic acid, 85 per cent, obtained by the fermentation of corn sugar, was simultaneously dehydrated and esterfied to lactyl-lactic acid and lactide by heating under progressively reduced pressures and at increasing temperatures, the process being completed at 150° C. Although such lactic acid derivatives may still contain as much as 10 per cent water of esterification, they have been found to be exceedingly reactive insofar as resin formation is concerned. Experiments have shown that this product is as suitable as pure crystalline dilactide which is obtained by dehydrating lactic acid at higher temperatures and then distilling.

160 grams of the technical lactide (1 mole·10% $H_2O$) was mixed with 92 grams (1 mole) of glycerol and 1.6 grams of stannic chloride and then heated under reduced pressure for approximately 2 days at a gradually increasing temperature up to 170° C. The vacuum was so regulated that the water of reaction was removed gradually and the final pressure was approximately 2 mm. Hg. At the conclusion of the reaction the viscous, pale yellow mass showed no tendency to boil. The glyceryl dilactate obtained in this manner is distilled in vacuo and a mass of soft white crystals boiling from 180° to 220° C. at 2.5 mm. is obtained. The simple ester is soluble in most organic solvents.

Di(glyceryl dilactate) triphthalate was prepared from glyceryl dilactate by adding 44.4 grams of phthalic anhydride to 47.4 grams of glyceryl dilactate and heating at an initial temperature of 120° C. under moderate vacuum. The heating was continued for 4 days at a gradually increasing temperature to about 160° C. As the reaction progresses, water is liberated and removed and the glyceryl-dilactate-triphthalate resin becomes more and more resistant to the effects of oxygen, thus permitting operations at atmospheric pressure.

The resin passes through the well-known reaction stages and exhibits a diminishing solubility in solvents. If arrested at the proper stage, the product is characterized by unusual toughness, flexibility and chemical resistance. The resultant products are light amber in color, and they soften with increasing temperatures. They are compatible with nitrocellulose lacquers and give a film which is flexible.

EXAMPLE II.—*Di(glyceryl dilactate) trisebacate resins*

Glyceryl dilactate is first prepared according to the procedure outlined in Example I. Sixty grams of this material are then heated with 77 grams of sebacic acid in a manner hereinabove set forth. On the whole, a shorter reaction period is required because the sebacic acid is not appreciably volatilized under these conditions. The temperature may be raised more rapidly and the whole reaction can be completed in one day.

The di(glyceryl dilactate) trisebacate resin obtained in this manner is in many respects similar to the corresponding tripthalate plastic. The product has a clear amber color and is syrupy when heated above 150° C. and readily undergoes further polymerization to a harder and less soluble resin. In the early stages, the product is soluble in many organic solvents, but this solubility is markedly diminished with increased chain length of the resin molecule which is brought about by continued heating. Amyl acetate, however, appears to be one of the best solvents for the various modifications of these resins.

EXAMPLE III.—*Di(glyceryl tartrate) trisebacate*

18.4 grams (0.2 mole) of anhydrous glycerol were mixed with 30 grams (0.2 mole) of tartaric acid and the mixture was heated rapidly in vacuo up to 185° C. This temperature was maintained for about one hour, at which time the mixture became homogeneous and formed a viscous liquid. On cooling, it solidified to a transparent and colorless glass-like substance, presumably a resin of the alkyd type. The glyceryl tartrate, which is brittle and hygroscopic, undergoes a marked transformation when the free hydroxyl groups are esterified with an equivalent amount of sebacic acid.

The primary ester was mixed with 60 grams (0.3 mole) of sebacic acid and heated at 190° to 200° C. for three hours. This time can be shortened by carrying out the esterification at 300° C. The melt became increasingly viscous and when cooled, a pale yellow, tough, rubbery material was obtained which did not absorb water and which was insoluble in most organic solvents. If in the preceding secondary esterification the heating is prolonged, the mass assumes a spongy character.

In carrying out our invention, other polyhydric alcohols, such as ethylene glycols, pentaerythritol, may be used in place of glycerol. Instead of lactic acid other hydroxycarboxylic acids, such as tartaric, beta-hydroxypelargonic, gluconic, glycollic and ricinoleic may be employed. Other polybasic acids may be used for the final esterification, of which the following are typical—succinic, adipic, sebacic, azelaic and phthalic.

It is clear also that the reaction temperatures and pressures may be varied over a wide range depending on the degree of resinification and type of product desired, because the reactive mass is not affected by the atmosphere at high temperatures, and we find that the reactions can be carried out up to 300° C., thus effecting an economy in the operating time. Although we prefer to add the polybasic acid to the simple ester, this process may be reversed. It is also feasible to add the dibasic acid before the primary esterification has been completed. It is furthermore possible to add two or more dibasic acids as the secondary esterifying components so as to make the resinoid more complex.

Other modifications of our invention will become apparent to those skilled in the art and we do not, therefore, wish to be limited except by the scope of the sub-joined claims, as interpreted in the light of the spirit of the invention.

Having thus described our invention, we claim:

1. A process for making resinous substances, comprising esterifying a polyhydric alcohol with an aliphatic hydroxycarboxylic acid to give an ester which contains at least as many hydroxyl groups as were originally available in the alcohol and then further reacting this ester with stoichiometric quantities of a polycarboxylic acid to combine with all free hydroxyl groups.

2. A process for making resinous substances, which comprises carrying out consecutive esterifications, first with polyhydric alcohols and aliphatic hydroxycarboxylic acids to give an ester containing at least as many hydroxyl groups as were originally available in the polyhydric alcohol and then esterifying with a stoichiometric quantity of a polycarboxylic acid to combine with all of the hydroxyl groups of the intermediate ester, said process being carried out at temperatures ranging from 100° to 300° C. and under reduced pressures.

3. The process for making resinous substances having di(glyceryl dilactate) triphthalate as the principal unit molecule, comprising esterifying glyceryl dilactate with stoichiometric quantities of phthalic anhydride at temperatures ranging from 100° to 300° C. thereby producing a functionally balanced plastic compound.

4. The process of making resinous substances having di(glyceryl dilactate) trisebacate as the principal unit molecule, comprising esterifying two moles of glyceryl dilactate with three moles of sebacic acid at temperatures ranging from 100° to 300° C.

5. The process for making resinous substances having di(glyceryl tartrate) trisebacate as the principal unit molecule, comprising esterifying two moles of glyceryl tartrate with three moles of sebacic acid and heating at temperatures ranging from 100° to 300° C.

6. A resinous compound comprising the complex products of the reaction between an ester derived from an aliphatic hydroxycarboxylic acid and a polyhydric alcohol which contains at least as many hydroxyl groups as were originally present in the alcohol, and substantially stoichiometric quantities of a polycarboxylic acid to combine with all free hydroxyl groups.

PHILIP H. GROGGINS.
JOHN T. STEARN.
BENJAMIN MAKOWER.